2025-01-01

United States Patent [19]

Arnold

[11] Patent Number: 4,652,294

[45] Date of Patent: Mar. 24, 1987

[54] FOLIAR FERTILIZATION METHOD AND COMPOUNDS

[75] Inventor: Scott Arnold, Fresno, Calif.

[73] Assignee: Professional Agricultural Management, Inc., Mendota, Calif.

[21] Appl. No.: 740,190

[22] Filed: May 31, 1985

[51] Int. Cl.$^4$ ............................................. C05C 9/00
[52] U.S. Cl. ......................................... 71/28; 71/29; 71/30; 71/60; 71/63; 71/64.1
[58] Field of Search ..................................... 71/28–30, 71/60, 63, 64.1

[56] References Cited

FOREIGN PATENT DOCUMENTS 7219722  6/1972  Japan ....................................... 71/28

OTHER PUBLICATIONS

CA 87(19) 150862t "Secondary and . . . Sprays" Jain, 1977.

*Primary Examiner*—Ferris H. Lander
*Attorney, Agent, or Firm*—Limbach, Limbach & Sutton

[57] ABSTRACT

Methods of application and compositions of foliar fertilizers are specifically chosen to address crop nutritive demands varying with growth stage. Two separately timed applications of foliar fertilizers are described. One corresponds to a bud emergence or seedling germination stage of plant development and the other corresponds to a reproductive or fruiting period of the crop's life cycle. Concentrations of required nutrients are related to the amount removed in crop production. Leaf surface penetration enhancers are added to each foliar fertilizer to increase nutrient uptake by the plants.

14 Claims, No Drawings

FOLIAR FERTILIZATION METHOD AND COMPOUNDS

DESCRIPTION

1. Technical Field

This invention relates generally to methods of application and compositions for agricultural fertilizers. More specifically, this invention relates to methods of application of specially formulated foliar fertilizers, to be applied at times related to the crops' nutritive requirements.

2. Background of the Invention

Plant growth and development, in both perennial and annual crops, is directly related to the plants' ability to obtain essential nutrients from its growth environment. Each nutrient has its own transport characteristics, determined by its polarity, reactivity with other elements in the soil system, the size of the molecule, and other diffusion properties. During the early phases of growth, corresponding to germination in annual plants or dormancy emergence in perennial plants, the plant root system is not well developed. Although the total requirement for any one nutritive element may be very small, the concentration of those nutritive elements in the soil system is also likely to be quite low. In order to be able to absorb the necessary mass of nutritive elements, the root system must cover a significant volume of soil.

Some of the more essential nutritive elements required by young seedlings or newly emerged perennial plants, have poor transport properties in the soil systems of the western states. These soil systems are typically neutral or alkaline. Poor transport of essential nutrients at early stages of growth hinders latter growth as well as ultimate crop production. To avert the problems encountered with soil system non-mobile nutrients, foliar application of fertilizers has been developed in California and other places to directly deliver the nutrient to a location for use. Foliar fertilizers have become popular because they are easy to apply and can be co-applied with pesticides and other spray additives.

The subject invention takes the concept of foliar application one step further. Recognizing that the nutritive requirement of any crop varies with the stage of development, and further, recognizing that sufficient concentrations of these required nutrients must be delivered to the crop in order to be effective, the subject invention relates to a critically timed application of nutrients. The concentrations of nutrients in the foliar fertilizers which are the subject of this invention are carefully formulated to ensure that sufficient concentrations of nutrients are being delivered to each plant.

It is therefore an object of this invention to provide methods and compositions for foliar application which are in phase with the various phases of plant growth and development.

It is an object of this invention to provide a staged application of two foliar fertilizers. It is yet another object of this invention to provide foliar fertilizers which are compatible with other spray additives and pesticides. It is yet another object of this invention to provide foliar fertilizers which may be applied from the ground or from the air.

SUMMARY OF THE INVENTION

This invention is related to a method of applying two foliar fertilizers at different times of plant growth and development. The composition of each fertilizer is designed to provide the required nutritive content necessary to counteract the stress situations caused by nutrient demand during plant growth. The foliar fertilizers are formulated to correspond to meet the plants' nutrient requirements. Both foliar fertilizers contain urea and humic acid to enhance the uptake of the nutritive elements at the leaf surface.

THE BEST MODE FOR CARRYING OUT THE INVENTION

Reduction of Nutritive-Deficient Ethylene Stresses

In defining a theoretical basis for the improved results experienced in the subject invention, it must be assumed that perennial crops progress through three loosely defined stages of growth during their annual cycle. The first of these stages is bud break. The second stage of growth is the period of rapid growth and maximum vegetative development. The third developmental stage occurs during the reproductive or fruit production and maturation phase of the crops' annual life.

Annual crops similarly progress through three stages of growth. The first is the germination and seedling establishment phase; a period of rapid vegetative growth is second. The reproductive or flower and fruit formation phase is the third stage.

In both perennial and annual crops, each of these three phases or stages of growth are partially defined by different nutritional demands. Unavailability of a particular nutrient creates plant stresses. These various stresses reduce the crops' ability for growth and yield. Definition of the nutritional parameters enables moderation of these stress factors through the timely application of remedial amounts of the identified nutritive elements. The resulting reduction in plant stress has the net effect of increasing the plant's efficiency, ultimately reflected in higher crop yields and/or increased crop quality.

Many, if not all, green plants respond to environmental stresses by producing ethylene. The tendency of stress to promote the production of ethylene by plant tissues has been proven to be so universal that the term "stress ethylene" has been coined. Plant responses to ethylene range from the subtle to the dramatic, including such diverse responses as growth promotion, growth inhibition, chlorophyll destruction, flower initiation, fruit growth stimulation, abscission and dehiscence promotion, accelerated senesence, seed and bud dormancy release, tissue proliferation, root and root hair initiation, etc. The plant type, age, or stage of growth and the ethylene concentration determine the character and degree of growth modification induced by "stress ethylene".

During the first stage of growth, i.e., the first thirty to sixty days after bud break or seedling germination, plant nutrients in critical demand or in stress-creating shortage are those nutritive elements that tend to be non-mobile in the soil system. The elements that are included in this group are the metallic divalent cations, zinc, iron, manganese, copper, magnesium and the inorganic anion phosphate. The commonality of these elements is that they all form insoluble or very slowly soluble reaction products in neutral to alkaline soil systems. These reaction products do not move from their position or point of placement, making root uptake difficult.

All plants absorb water and nutrients through young actively growing root hairs. However, when the plant is in the seedling stage or just emerging from a dormancy cycle, its relative size and efficiency is at a low. The root surface area is at a minimum value, limiting the diffusion rates for the intake of required nutrients. At this stage of its growth, the plant is unable to efficiently forage for these non-mobile elements; therefore, the uptake of these non-mobile elements is very low. The small physical size and inefficiency of the small root system, combined with the cold, wet solids often encountered in the early spring, results in a root system that does not contact a sufficient volume of soil. Since the plant and the nutrients are both non-mobile, the plant's requirement of these essential growth factors is not met. Once the root system has reached the root proliferation stage, the critical demand for these non-mobile metals will have passed.

This invention is addressed to the nutrient transport problem encountered at crucial stages of plant development. A first foliar fertilizer consists of a mixture of zinc, iron, manganese and copper, especially formulated in a scientifically determined ratio to approximately match the relative amount of these elements removed in crop production. The first foliar fertilizer product is also formulated so that at one gallon per acre rates, it contains a sufficient mass of each component to become a significant factor in meeting the plant's total requirements for each component element.

Application of the first foliar fertilizer to the leaves eliminates the transport difficulties caused by formation of insoluble reaction products in neutral or alkaline soil systems. The timing for the application of the first foliar fertilizer is meant to coincide with the maximum demand for these nutrients, during the crop's first stage of growth and development. The efficacy of this treatment is thought to be related to its suppression of ethylene production in the treated plants. The metallic cations included in the first foliar fertilizer may influence the enzyme systems involved in the biosynthesis of ethylene. It is well documented that a copper catalyzed enzyme system is involved in the synthesis of ethylene.

The second critical stage is one of rapid vegetative growth. During this period of the plant's development, the elements or nutrients most likely to be limiting factors in plant growth are nitrogen, sulfur and potash. These elements are best supplied in the form of soil-applied fertilizers. Nitrogen and sulfur form very mobile (soluble) anions and can be applied in any form as they move in the soil system. Potash, although not readily mobile in the soil system, should be soil-applied due to the relatively large amounts required by most plants. The subject invention does not address these nutritive requirements, leaving them to be met through conventional soil-applied fertilizers.

The third and final critical stage of growth is characterized by the reproductive or fruiting period of the crops' life cycle. The nutritional elements that are critically important during this timeframe include calcium, boron, and molybdenum. During the fruiting or seed production time, plant stress is created by increased carbohydrate demand. Under high fruit loads or reduced carbohydrate synthesis and/or translocation, a critical shortage of photosynthate is created. The demand for carbohydrate exceeds the plant's ability to supply carbohydrates.

The elements, calcium and boron, and perhaps molybdenum, are involved in the translocation of carbohydrate from the leaf to the areas of stress (fruit, buds, root tips and other growing points). Applications of calcium, boron and molybdenum increase the translocation of photosynthate from the leaf to the utilization sites, allowing the plant to produce more fruits of a higher quality, notably increased sugar, starch and protein content.

The second foliar fertilizer of the subject invention is designed to reduce carbohydrate stress. The fertilizer is formulated to supply calcium, boron and trace amounts of molybdenum during these stress periods. The second foliar fertilizer also contains additives known to increase leaf penetration and nutrient translocation. The second foliar fertilizer is also formulated to be safe at label rates of one gallon per acre, supplying growth-significant amounts of these essential additives. As described above, foliar application permits rapid response by the plant to the stresses created during this final growth stage.

OPTIMUM CONDITIONS FOR FOLIAR APPLICATION

The relative effectiveness of these foliar fertilizers is dependent upon the rate and magnitude of the transport of their nutritive constituents across the leaf surface. Enhanced transport is responsible for the improved results obtained when using these time specific foliar fertilizers. Several factors have been discovered to affect the foliar uptake. It is well known that good surfactants increase foliar uptake. Urea, humic acid and other weak organic complexing agents improve cellular penetration. Iron and phosphate, among other nutrients, are more rapidly absorbed under conditions of increased temperature and light. An acidic leaf surface also enhances foliar uptake. Young plant tissue absorbs most efficiently. Humid leaf surfaces also permit increased uptake. Optimally, the foliar fertilizers are best applied in early morning or late afternoon. While each of the subject foliar fertilizers is formulated with urea and humic acid, choice of the time of day and temperature for application must be delegated to the end user.

EXPERIMENTAL DATA

Field applications of the subject invention have shown improved yields and fruit quality. In these field applications, the following formulations of fertilizers were used.

TABLE 1

| Composition of First Foliar Fertilizer | |
|---|---|
| Minimum Guaranteed Analysis | |
| 3-8-3 (N—P—S) | |
| Total Nitrogen (N) - 3% | |
| 2% Urea Nitrogen | |
| 1% Ammonic Nitrogen | |
| Available Phosphoric Acid ($P_2O_5$) | 8% |
| Sulfur (S) | 3% |
| Copper (Cu) | .2% |
| Iron (Fe) | 4% |
| Manganese (Mn) | 2% |
| Zinc (Zn) | 4% |
| Active Ingredients | |
| Humic Acid | 1% |
| Surfactant-wetting agent | 1% |

Derived from urea, ammoniated manganese sulfate, phosphoric acid, copper sulfate, ferrous sulfate, zinc sulfate, technical humic acid and surfactant.

TABLE 2

| Composition of Second Foliar Fertilizer | |
|---|---|
| Guaranteed Analysis | |
| 6-0-0 (N—P—S) | |
| Total nitrogen (N) | 6% |
| Nitrate nitrogen | 6% |
| Available Phosphoric acid ($P_2O_5$) | 0% |
| Soluble Potash ($K_2O$) | 0% |
| Calcium (Ca) | 8% |
| Boron (B) | 1% |
| Molybdenum (Mo) | .05% |

Derived from calcium nitrate, Solubor and sodium molybdate. Product contains 1 percent surfactant and 2 percent humic acid.

A. Processing Tomatoes.

In this field test, Castle long variety processing tomatoes were planted in a one hundred sixty acre field. Eighty acres were treated with the first and second foliar fertilizers; the other eighty acres were untreated. Two applications of one-half gallon per acre of the first foliar fertilizer were performed at two separate times. The second foliar fertilizer was applied at a concentration of three quarts per acre.

The untreated acres yielded thirty-two (32) tons of tomatoes per acre while the treated fields produced thirty-four (34) tons per acre.

B. Fresh Market Tomatoes.

In this field test, eight plots were planted. Each plot was one row of tomato plants one hundred feet long. Plots number 1, 3, 5 and 7 were treated with both foliar fertilizers which are the subject of this invention. Plots 2, 4, 6, and 8 were treated only with the second foliar fertilizer. The first foliar fertilizer was applied at concentration levels of one-half gallon per acre on Apr. 14th, temperature conditions being 75 degrees Farenheit, weather conditions sunny, and the seedlings six inches high. The second application of the first foliar fertilizer at concentrations of one-half gallon per acre was performed on May 1st, a sunny day with temperatures of 85 degrees Farenheit. The second foliar fertilizer was applied to plots 1, 3, 5 and 7 on May 15th, at concentrations of three quarts per acre and temperatures of 90 degrees Farenheit. Plots 2, 4, 6, and 8 were also treated with the second foliar fertilizer on May 15th at the same concentration levels. The results are presented in Tables 3 and 4.

TABLE 3

Raw Data

| Plot No. | # of Fruit | Grades (Lbs/Plot) | | | |
|---|---|---|---|---|---|
| | | No. 1 | Culls | Small | Total |
| 1 | 227 | 30.0 | 21.0 | 13.5 | 64.5 |
| 2 | 233 | 26.0 | 16.0 | 15. | 58.0 |
| 3 | 243 | 37.5 | 25.5 | 11.5 | 74.5 |
| 4 | 177 | 31.5 | 15.0 | 11.5 | 58.0 |
| 5 | 227 | 47.5 | 12.5 | 14.5 | 74.5 |
| 6 | 194 | 37.0 | 15.5 | 11.5 | 64.0 |
| 7 | 219 | 42.0 | 15.5 | 11.0 | 68.5 |
| 8 | 224 | 31.5 | 14.0 | 16.0 | 61.5 |

TABLE 4

Comparative Data.

| Totals # of Toma. | No. 1 | % Check | Culls | % Check | Small | % Check | Total | Total Yield | % of Check |
|---|---|---|---|---|---|---|---|---|---|
| Treated | 157 | 125 | 74.5 | 123 | 50.5 | 94 | 282.0 | 282.0 | 117 |
| Untreated | 126 | 100 | 60.5 | 100 | 54.0 | 100 | 241.5 | 241.5 | 100 |

C. Cantaloupes.

A field trial was performed using cantaloupes as the test crop. A series of melon fields were closely monitored to determine improvements in yield from the use of the first foliar fertilizer. Eight sections of the field were treated with the first foliar fertilizer in two separate applications; eight other sections of the field were not treated at all.

The yield comparison for the two cantaloupe fields is as follows: the treated cantaloupe field produced six percent more melons than the untreated cantaloupe field. A total of 204 melons were produced in the treated fields while 193 melons were produced in the untreated fields.

D. Treatments.

In a field test using cotton, the first foliar fertilizer was applied to a section of the field in two separate treatments, each at a concentration of one-half gallon per acre. The results of a fruit count on July 16, 1984 are presented in Table 5.

TABLE 5

| | Cotton Field Test. | |
|---|---|---|
| | Treated | Untreated |
| Bolls | 39 | 29 |
| Blooms | 9 | 4 |
| Squares | 179 | 215 |

Random sample of 5 plants from each plot.

E. Lima Beans.

Treated lima bean plants were compared with untreated lima bean plants to determine the increase in yield resulting from treatment with the first and second foliar fertilizers. The results of this test are shown in Table 6, indicating better than a fifty percent increase in yield in treated fields.

TABLE 6

| Treatments | Yield* Gms./Plot** |
|---|---|
| 1. Pro-Gro 1 GPA. | 2270 |
| 2. Pro-Set 1 GPA. | 2043 |
| 3. Untreated Checks | 1362 |

*Yield included beans and pods
**Sampled 2' in middle of 12' plts × 3 reps.

While the subject invention has been described with reference to preferred embodiments, it will be apparent that other changes and modifications could be made by one skilled in the art, without varying from the scope or spirit of the claims appended hereto.

I claim:

1. A method for increasing crop yields and crop quality of annual crops growing in neutral or alkaline soil systems, which comprises the steps of:
   (a) applying an ethylene stress reducing fertilizer comprising soil-non-mobile, metallic divalent cations and a foliar uptake enhancer to said annual crops during a first phase of crop growth characterized by seed germination or seedling establishment, and (b) applying a photosynthate translocation enhancing fertilizer to said annual crops during a third phase of crop growth characterized by reproduction or fruiting.

2. The method of claim 1 wherein said soil-non-mobile, metallic divalent cations are selected from the group consisting of zinc, iron, manganese, copper and mixtures thereof.

3. The method of claim 1 wherein said photosynthate translocation enhancing fertilizer comprises members selected from the group consisting of calcium, boron, molybdenum, their salts and mixtures thereof.

4. The method of claim 1 wherein said foliar uptake enhancer comprises urea and humic acid.

5. The method of claim 1 wherein the concentration of soil-non-mobile, metallic divalent cations in said first foliar fertilizer is approximately equivalent to the relative amounts of said cations removed in crop production.

6. The method of claim 1 wherein said photosynthate translocation enhancing fertilizer further comprises humic acid to increase leaf penetration.

7. The method of claim 1 wherein the concentration of photosynthate translocation enhancers in said second foliar fertilizer constitutes a significant source of nutrients for plant growth.

8. A method for increasing crop yields and crop quality in perennial crops growing in neutral or alkaline soil systems, which comprises the steps of:
(a) applying an ethylene stress reducing fertilizer comprising soil-non-mobile metallic divalent cations and a foliar uptake enhancer to said perennial crops during a first phase of crop growth characterized by dormancy emergence, and
(b) applying a photosynthate translocation enhancing fertilizer to said perennial crops during a third phase of crop growth characterized by reproduction or fruiting.

9. The method of claim 8 wherein said soil-non-mobile metallic divalent cations are selected from the group consisting of zinc, iron, manganese, copper and mixtures thereof.

10. The method of claim 8 wherein said photosynthate translocation enhancing fertilizer comprises members selected from the group consisting of calcium, boron, molybdenum, their salts and mixtures thereof.

11. The method of claim 8 wherein said foliar uptake enhancer comprises urea and humic acid.

12. The method of claim 8 wherein the concentration of soil-non-mobile, metallic divalent cations in said first foliar fertilizer is approximately equivalent to the relative amounts of said cations removed in crop production.

13. The method of claim 8 wherein said photosynthate translocation enhancing fertilizer further comprises humic acid to increase leaf penetration.

14. The method of claim 8 wherein the concentration of photosynthate translocation enhancers in said second foliar fertilizer constitutes a significant source of nutrients for plant growth.

* * * * *